United States Patent [19]

Newman

[11] Patent Number: 5,031,332
[45] Date of Patent: Jul. 16, 1991

[54] ENVELOPE ADDRESS-POSITIONING GUIDE

[76] Inventor: Frederick S. Newman, 842 Millrace Point, Longwood, Fla. 32750

[21] Appl. No.: 625,895

[22] Filed: Dec. 11, 1990

[51] Int. Cl.$^5$ .............................................. G01B 3/14
[52] U.S. Cl. .................................................... 33/562
[58] Field of Search ................ 33/562, 566, 565, 613

[56] References Cited

U.S. PATENT DOCUMENTS

| | | | |
|---|---|---|---|
| 1,827,375 | 10/1931 | Schneider | 33/562 X |
| 4,586,906 | 5/1986 | Buccieri | 33/562 X |
| 4,854,048 | 8/1989 | Goulet | 33/443 |

Primary Examiner—Harry N Haroian
Attorney, Agent, or Firm—Edward M. Livingston

[57] ABSTRACT

A folding type of envelope-addressing guide is provided with a base plate 2 having a location ruler 4 at a bottom edge and a hinged cover plate 1 with address-positioning edges 12 and 21 that overlay the base plate 2 that is equal to maximum thickness of letters 9 that can be machine sorted. Line guides and instructions 22 are provided to facilitate machine-sortable addressing and effective handling of personal letters and occasional business letters the same as for mass-mailing business letters according to applicable mailing rules and regulations.

20 Claims, 2 Drawing Sheets

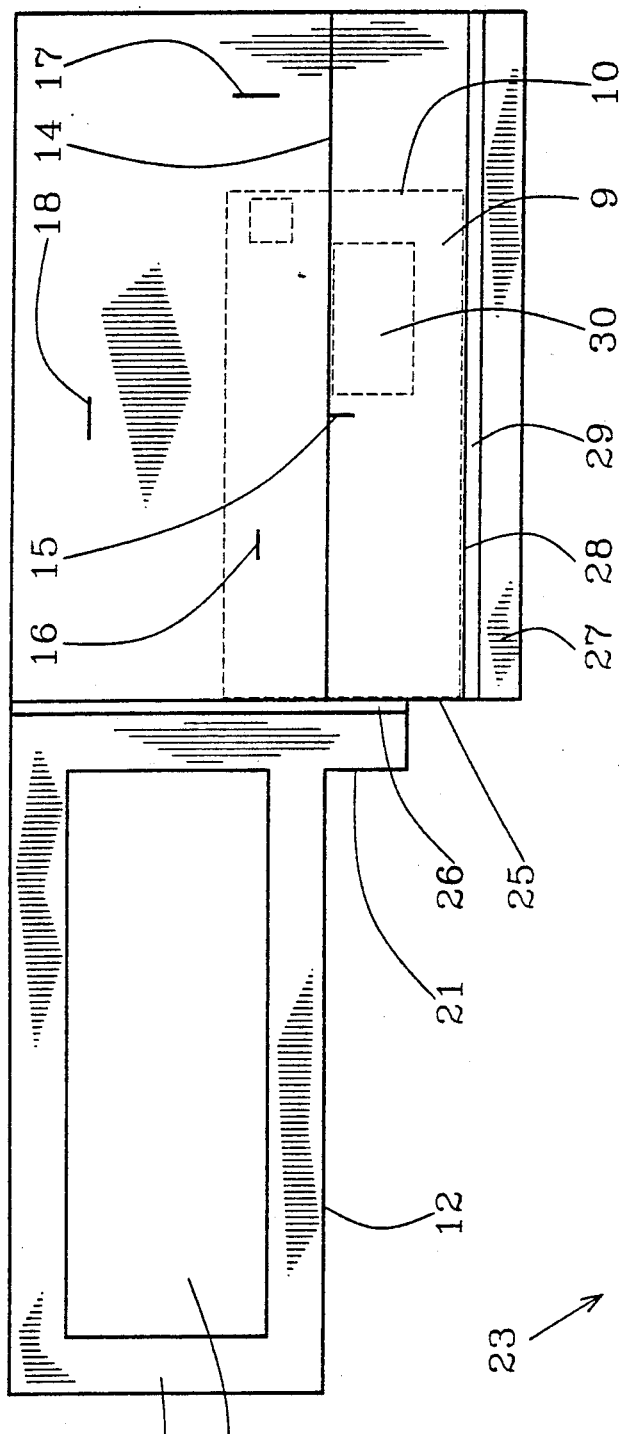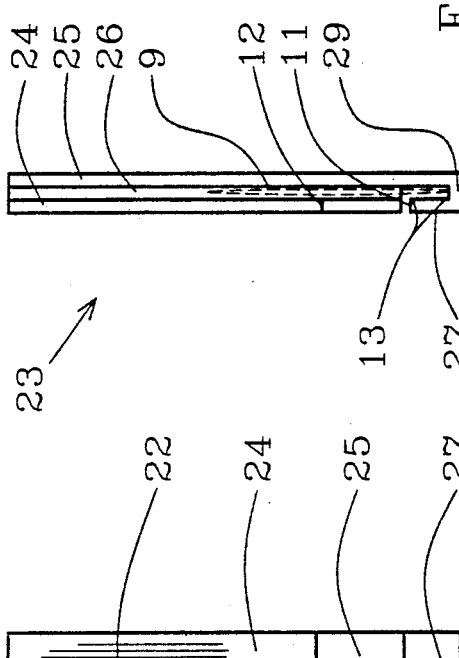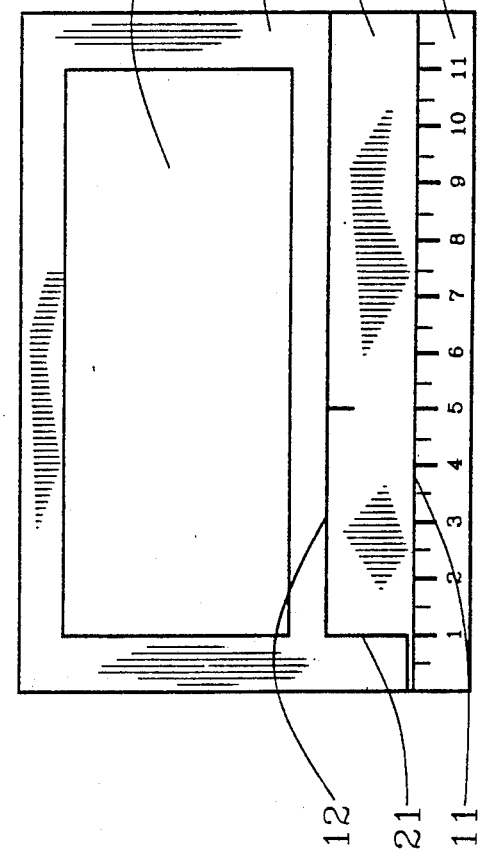

ENVELOPE ADDRESS-POSITIONING GUIDE

BACKGROUND OF THE INVENTION

This invention relates to guide mechanisms for positioning addresses on letters for machine sorting by postal services. In particular, it is a folder type of guide into which a postal envelope is placed for marking indicia to position a printed destination address for machine sorting of personal as well as business letters.

There are a wide variety of templates and guides for lettering. But none are known for positioning addresses on envelopes in a manner that is convenient for personal as well as for occasional or low-use-rate addressing of business letters as provided by this invention.

Examples of related but different prior art include the following U.S. patent documents:

| | | |
|---|---|---|
| 4,854,048 | 8/1989 | Goulet |
| 4,640,018 | 2/1987 | Gigliotti |
| 4,586,906 | 5/1986 | Buccieri, Jr. |
| 3,227,472 | 1/1966 | Swift |
| 1,827,375 | 10/1931 | Schneider |
| 1,441,440 | 1/1923 | Mackness |
| 684,142 | 10/1901 | Ward |
| 274,031 | 3/1883 | Requa |

The oldest prior art found, Requa, was a folder type of guide, but it was constructed specifically for aid in forming letters with handwriting. Like most of the prior art, it was a template for specific formation of lines related to alphabetical letters and numbers. By contrast, this invention is a guide for positioning of addresses on envelopes for machine sorting.

The remaining patents show various guide devises. For instance, Ward taught a hinged means for holding a soft-metal cutting bed in relation to a manual cutting tool. Schneider taught a template guide for folding letters to be inserted into window envelopes. Macknesss taught a template for measuring material. Swift taught a container for meter-reading cards. Buccieri, Jr. taught a lottery-marking guide with a folder having an opaque or transparent plastic template heat sealed along one edge. Gigliotti taught a folder-type checkbook recording device with templates. Goulet taught a template for assistance to truck drivers in entering daily information while in the cab of a truck.

Both business and personal mail which is addressed according to applicable rules and regulations can be sorted and handled much faster with sorting machines than mail that is improperly addressed and therefore must be sorted by hand. Consequently, such properly-addressed mail takes less time in reaching its destination addresses. There is, therefore, a need for a guide and methods for its use in addressing personal mail and occasional business mail in a manner that it will be sorted by automatic sorting machines to facilitate its handling and decrease its delivery time.

SUMMARY OF THE INVENTION

One object of this invention is to provide a convenient physical guide for positioning printed, typed or stamped addresses on letter envelopes in a manner that they can be machine sorted.

Another object is to measure envelope size for comparison size requirements for machine sorting and for cost rates in accordance with size.

A further object is to measure thickness of filled envelopes in comparison to thickness requirements for machine sorting.

An even further object of this invention is to provide instructions convenient to a user of the guide for use of the guide in addressing envelopes.

Still another object of this invention is to provide instructions, regulations, postage rates and helpful procedures convenient to a user of this addressing guide for utilizing postal services most effectively.

To accomplish these objects, a folder-type of envelope-lettering guide is provided with base plate having a location ruler at the bottom edge and a hinged cover plate with address-positioning edges that overlay the base plate when the cover plate is swiveled over the base plate. The cover plate is flush with the base plate so as to provide a firm surface when stamping addresses on the envelope which is empty when stamped. The location ruler is a distance from the base plate that is equal to maximum thickness of stuffed envelopes that can be machine sorted with postal-service equipment. Line guides and instructions are provided to facilitate machine-sortable addressing and effective handling of personal letters and occasional business letters the same as for mass-mailing of business letters according to applicable mailing rules and regulations.

BRIEF DESCRIPTION OF THE DRAWINGS

This invention is described in appended claims in relation to a description of a preferred embodiment and the following drawings wherein:

FIG. 4 is an unfolded view of a one-piece foldable embodiment of the invention;

FIG. 5 is a folded view of the FIG. 4 device; and

FIG. 6 is an end view of the FIG. 4 device.

DESCRIPTION OF PREFERRED EMBODIMENTS

Figure 1:
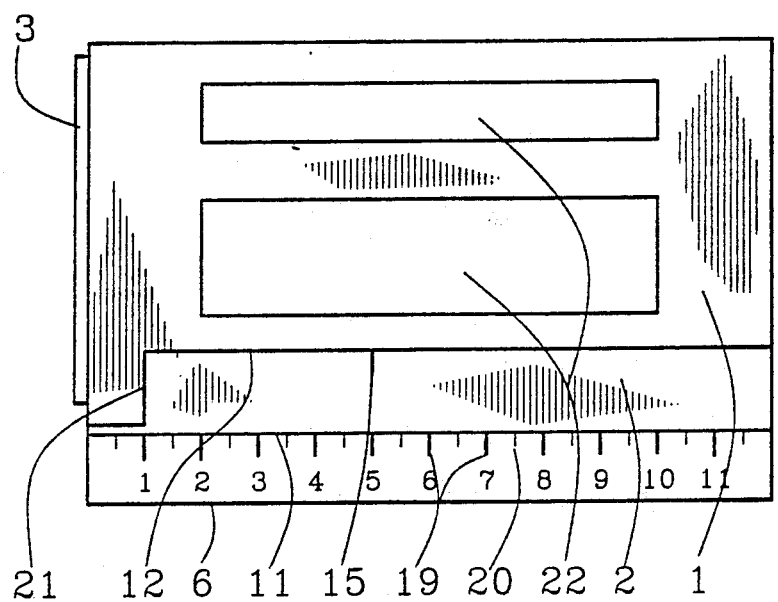
FIG. 1 is a front view of the invention.
Figure 2:
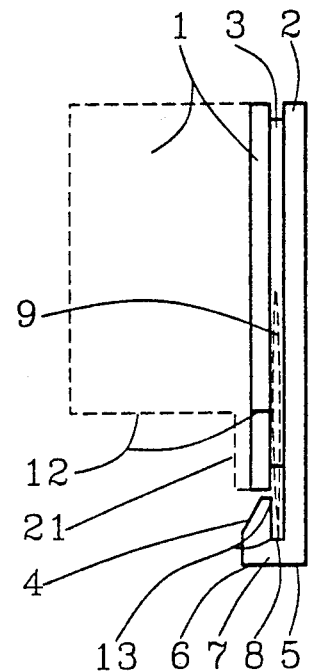
FIG. 2 is an end view.
Figure 3:
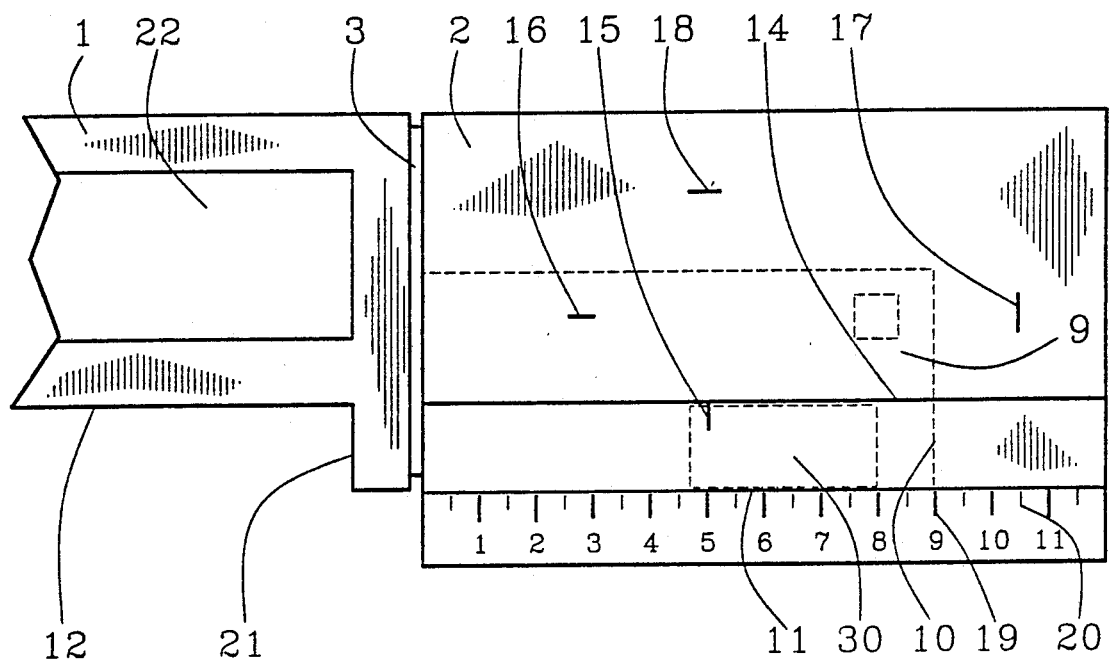
FIG. 3 is a front view with a cover plate opened and cut away in part.

Referring to FIGS. 1-3, a cover plate 1 is attachable to a base plate 2 with a positioning hinge 3. A location ruler 4 is attached to a base-plate bottom edge 5 at a ruler bottom edge 6. A ruler attachment means 7 is extended between the base plate 2 and the ruler 4. The ruler attachment means 7 is provided with an attachment-means top surface 8 onto which a letter envelope 9 is placed.

A mail envelope 9 is placed stamp-side-up and stamp-end-right on the attachment-means top surface 8 with the cover plate 1 either swiveled open away from close proximity to the base plate 2. The envelope may also be inserted from the right end of the base plate 2 and cover plate 1. The left end of the envelope 9 is then buttressed against positioning hinge 3.

With the envelope 9 retained in a position bounded by the attachment-means top surface 8 at the hinge 3, the cover plate 1 is swiveled to a position over the envelope 9 and approximately parallel to the base plate 2. Then a removable or appropriately inconspicuous mark is made on the envelope 9 at a position one inch from the right or stamp end 10 of the envelope 9 to indicate positioning of the right end of an address to be printed, stamped or typed onto the envelope 9. A removable or appropriately inconspicuous mark is made then at a ruler top surface 11 and at a cover-plate top guide edge 12.

An address is then printed, typed or stamped in uppercase letters on the envelope 9 with left lines of the address vertically straight and the right end of the address one inch from the stamp end 10. All punctuation should be eliminated from the address except for a hyphen between a zip code number and a four-digit number, when used, to the right of the zip code number. A country name should be by itself as a last line of an address. Dark-black ink should be used for the address. The address should be parallel to the bottom of the envelope 9 at a distance from the envelope bottom no less than seven-eighths of an inch as indicated by ruler extended portion 13 above attachment-means top surface 8.

After the envelope 9 is addressed, it should not be thicker than three-sixteenths of an inch when compressed. Thickness of a filled envelope is measurable by three-sixteenths of a inch positioning of the ruler 4 from the base plate 1 by ruler-attachment means 7. Thickness of the filled envelope 9 is measurable also by three-sixteenths of an inch positioning of the location ruler 4 from the base plate 2 with hinge 3.

On the surface of the base plate 2 are positioned address-top line 14, envelope minimum-length line 15, envelope minimum-height line 16, envelope maximum-length line 17 and envelope maximum-height line 18. The minimum lines are the minimum envelope sizes that can be accepted according to applicable regulations for machine sorting. The maximum lines are the maximum envelope sizes that can be accepted for machine sorting and also the maximum that can be accepted without increased rates for large envelopes. The minimum and maximum lengths, 15 and 17, are five inches and ten-and-one-half inches, respectively, as measured from an inside wall of hinge 3. The minimum and maximum heights, 16 and 18, are three-and-one-half inches and six-and-one-eighth inches, respectively, as measured from attachment-means top surface 8. These minimum and maximum lines can be made in a distinctive color relative to color of the base plate 2 for visual convenience and for aesthetic preferences.

The location ruler 4 can be provided with numbered digit lines 19 one inch apart with half-inch lines 20 between them.

Typically the base plate 2 is eight inches from bottom to top and twelve inches in length. The cover plate 1 is twelve inches long also but provided with cover-plate top guide edge 12 parallel to ruler 4 and attachment-means top surface 8. The cover-plate top guide edge 12 is two-and-three-eighths inches above attachment-means top surface 8. A cover-plate left guide edge 21 is positioned one inch from hinge end of cover plate 1 and extended slightly less than the distance between ruler top surface 11 and cover-plate top guide edge 12.

Positionable on a surface or surfaces of cover plate 1 and base plate 2 can be instructions for use of this invention. Postal information, postage rates and helpful procedures also can be positioned on surfaces of plates 1 and 2. Instruction areas 22 are outlined approximately for such instructions, information and helpful procedures. A trade name or other identification of the invention also can be positioned on a suitable surface of the plates 1 and 2.

An address area 30 is indicated with dashed lines on envelope 9 which also is indicated with dashed lines.

Referring to FIGS. 4–6, a single cut or formed piece of material can be used to construct a one-piece address-positioning guide 23 with the same physical and function features. A selectively-rigid cover-plate section 24 can be attached to or extended from a selectively-rigid base-plate section 25 with a selectively-flexible hinge section 26. A selectively-rigid ruler section 27 can be attached to or extended from a base-plate bottom 28 with a selectively rigid ruler-attachment section 29.

When the one-piece unit 23 is folded, all other features are the same and the operation is the same as for the FIG. 1–3 embodiment of this invention. The FIG 1–3 embodiment can be used by those who desire a durable and more expensive unit. The FIG. 4–6 unit can be constructed of plastic or thick paper materials and sold inexpensively for those who desire less expensive units. Both can be aesthetically appealing and convenient to aid use of the mail services. Both can be sold as gift items or as popular and useful tools of communication.

All other improvements, modifications and variations of this invention are included within the scope and spirit of the claims.

I claim:

1. An envelope address-positioning guide comprising:
   a base plate having select width and length in relationship to select mail envelopes;
   a location ruler parallel to the base plate positioned at a distance from the base plate that is equal to maximum thickness of the select mail envelopes;
   a ruler attachment means in attachment relationship between a bottom portion of the base plate and a bottom portion of the location ruler;
   a top edge of the location ruler parallel to a top wall of the ruler attachment means at a distance from the top wall of the ruler attachment means that is equal to a distance from a bottom of select envelopes to a bottom of address indicia to be positioned selectively on the select mail envelopes;
   a cover plate having a left edge swivelably attached to a left edge of the base plate and swivelable with a swivelable cover-attachment means to a position parallel to the base plate;
   a cover-plate left guide edge perpendicular to the top wall of the ruler attachment means at a distance from an inside wall of the swivelable cover-plate attachment means that is equal to a select minimum distance between a left edge of address indicia and a left edge of select mail envelopes on which the address indicia is to be positioned; and
   a cover-plate top guide edge parallel to the top wall of the ruler attachment means at a distance from the top wall of the ruler attachment means that is equal to a select minimum distance from a bottom of select mail envelopes to a top of address indicia to be positioned selectively on the select mail envelopes and extending from the cover-plate left guide edge to a right edge of the cover plate.

2. An envelope address-positioning guide according to claim 1 and further comprising:
   envelope size indicia on a top surface of the base plate indicating minimum width and length and maximum width and length of the select envelopes.

3. An envelope address-positioning guide according to claim 2 wherein the size indicia are lines indicating minimum and maximum width and length of envelopes which are acceptable by applicable postal regulations for automated mail sorting.

4. An envelope address-positioning guide according to claim 2 wherein the size indicia are lines indicating minimum and maximum width and length of envelopes which are acceptable by applicable postal regulations without additional charges for large-sized envelopes.

5. An envelope address-positioning guide according to claim 2 and further comprising:
addressing guides on how to use this envelope address-positioning guide positioned on a surface thereof.

6. An envelope address-positioning guide according to claim 2 and further comprising:
mailing instructions for handling and sending mail effectively positioned on a surface of the envelope address-positioning guide.

7. An envelope address-positioning guide according to claim 2 and further comprising:
postage rates positioned on a surface of the envelope address-positioning guide.

8. An envelope address-positioning guide according to claim 2 wherein width of the base plate from bottom to top is eight inches, length of the base plate is twelve inches, and length of the location ruler is twelve inches.

9. An envelope address-positioning guide according to claim 2 wherein width of the location ruler above the top surface of the ruler attachment means is seven-eighths of a inch, and distance of the top guide of the cover plate from the top surface of the location ruler is one-and-one-half inches.

10. An envelope address-positioning guide according to claim 2 wherein width of the location ruler above the top surface, of the ruler attachment means is seven-eighths of a inch, distance of the top guide of the cover plate from the top surface of the location ruler is one-and-one-half inches, and distance from the inside wall of the swivelable-attachment means to the left guide of the cover plate is one inch.

11. An envelope address-positioning guide according to claim 2 wherein width of the location ruler above the top surface of the ruler attachment means is seven-eighths of an inch, distance of the top guide of the cover plate from the top surface of the location ruler is one-and-one-half inches, distance from the inside wall of the swivelable-attachment means to the left guide of the cover plate is one inch, width of the base plate from bottom to top is eight inches, length of the base plate is twelve inches, and length of the location ruler is twelve inches.

12. An envelope address-positioning guide according to claim 2 wherein width of the location ruler above the top surface of the ruler attachment means is seven-eighths of an inch, distance of the top guide of the cover plate from the top surface of the location ruler is one-and-one-half inches, distance from the inside wall of the swivelable-attachment means to the left guide of the cover plate is one inch, width of the base plate from bottom to top is eight inches, length of the base plate is twelve inches, length of the location ruler is twelve inches, and distance from the top surface of the base plate to the intermediate inside wall of the location ruler is three-sixteenths of a inch.

13. An envelope address-positioning guide according to claim 2 wherein increments of the positioning ruler are inches with half-inch increments midway between each.

14. An envelope address-positioning guide according to claim 1 wherein the base plate and the cover plate are comprised of rigid and selectively thick material and the swivelable attachment means is a rigid-walled hinge with plates thereof attached to left walls of the base plate and cover plate at distances from a hinge pin to each plate that combined distances from both sides of the hinge pin total a select distance between the base plate and the cover plate when swiveled parallel to each other.

15. An envelope address-positioning guide according to claim 14 wherein the cover plate is transparent.

16. An envelope address-positioning guide according to claim 1 wherein the base plate, positioning ruler and cover plate are portions of a single selectively-rigid sheet of material with swivelable relationship between a base-plate left edge and a cover-plate left edge of a swivelable connection between the base plate and the cover plate and with swivelable relationship between a base-plate bottom edge and a location-ruler bottom edge.

17. An envelope address-positioning guide according to claim 1 wherein the base plate and the cover plate are separate selectively-rigid sheets of material with a selectively rigid sheet of material three-sixteenths of an inch wide between their left edges which are joined to the base plate and cover plate with flexible material and the location ruler is a separate selectively rigid sheet joined to the base plate with a rigid wall three-sixteenths of an inch wide between a bottom edge of the base plate and a bottom edge of the positioning ruler.

18. An envelope address positioning guide according to claim 17 wherein width of the location ruler above a top surface of the rigid wall by which the location ruler is attached to the base plate is seven-eights of an inch, distance of the top guide of the cover plate from the top surface of the location ruler is one-and-one-half inches, distance from an inside wall of the rigid sheet of material between the base plate and the cover plate to the left guide of the cover plate is one inch, width of the base plate from bottom to top is eight inches, length of the base plate is twelve inches, length of the location ruler is twelve inches divided in one-inch numbered increments with one-half-inch markings midway between each, distance from the top surface of the base plate to the intermediate inside wall of the location ruler is three-sixteenths of a inch, and further comprising:
envelope size indicia on a top surface of the base plate indicating minimum width and length and maximum width and length of select envelopes.

19. An envelope address-positioning guide according to claim 18 wherein size indicia on a top surface of the base plate are lines indicating minimum and maximum width and length of envelopes which are acceptable by applicable postal regulations without additional charges for off-sized envelopes.

20. A method for using an envelope address-positioning guide comprised of a base plate; a cover plate with the left edge swivelably attached to a left edge of the base plate with a select distance between left edges of the base plate and cover plate; a location ruler with its bottom edge attached to a bottom edge of the base plate with a select distance between the location ruler and the base plate in parallel relationship; a select width of the location ruler from a top wall of a means of attachment of the location ruler to the base plate parallel to a bottom edge of the base plate; a cover-plate left guide edge perpendicular to a top wall of the ruler attachment means at a distance from an inside wall of the swivelable cover-plate attachment means that is equal to a select minimum distance between a left edge of address indicia and a left edge of select mail envelopes on which the address indicia is to be positioned; and a cover-plate top guide edge parallel to a top wall of the ruler attachment means at a distance from the top wall of the ruler attachment means that is equal to a select minimum distance from a bottom of select mail envelopes to a top of address indicia to be positioned selectively on the select mail envelopes and extending from the cover-plate left guide edge to a right edge of the cover plate, said method comprising the following steps:

positioning an envelope to be addressed on a top edge of the ruler attachment means between intermediate surfaces of the base plate and the location ruler;

buttressing a left end of the envelope against the means of attachment of the base plate to the cover plate;

swiveling the cover plate to a position of contact with the envelope buttressed against the top edge of the ruler attachment means and the means of attachment of the base plate to the cover plate;

removably marking the envelope lightly with indicia of a select rectangular area within bounds of a top edge of the location ruler, a bottom of the cover-plate top guide edge, an inside wall of a cover-plate left guide edge and a select distance in inches from a right end of the envelope;

selectively printing an address on the envelope within the select rectangular area; and assuring select thickness of the envelope with contents in relationship to distance between the location ruler and the base plate.

* * * * *